United States Patent [19]
Seltzer et al.

[11] 3,729,448

[45] Apr. 24, 1973

[54] POLYIMIDES FROM 2,6-DIAMINO-S-TRIAZINES AND DIANHYDRIDES

[76] Inventors: Raymond Seltzer; David A. Gordon, both of 63 E. 9th St., New York, N.Y. 10003

[22] Filed: Oct. 31, 1969

[21] Appl. No.: 873,109

[52] U.S. Cl............260/65, 117/124 E, 117/126 GR, 117/128.4, 117/132 B, 117/138.8 D, 117/138.8 UF, 117/145, 117/148, 117/155 R, 161/182, 161/197, 161/227, 260/30.2, 260/30.6 R, 260/30.8 R, 260/30.8 DS, 260/32.2, 260/32.4, 260/32.6 N, 260/33.4 P, 260/47 CP, 260/78 TF, 260/248 SC
[51] Int. Cl. .............................................C08g 20/32
[58] Field of Search......................260/47 CZ, 78 TF, 260/65, 248 CS

[56] References Cited

UNITED STATES PATENTS

| | | | |
|---|---|---|---|
| 3,179,630 | 4/1965 | Endrey | 260/78 |
| 3,342,774 | 9/1967 | Hoegger | 260/47 |
| 3,448,080 | 6/1969 | Hirsch | 260/65 |
| 3,528,937 | 9/1970 | Reynolds et al. | 260/29.2 |

*Primary Examiner*—William H. Short
*Assistant Examiner*—L. L. Lee
*Attorney*—Karl F. Jorda, Bruce M. Collins, Martin J. Spellman, Jr. and Nestor W. Shust

[57] ABSTRACT

Triazine-based polyimides are prepared by first reacting dianhydrides with s-triazine compounds containing at least two primary aromatic, aliphatic, cycloaliphatic or heterocyclic amino groups to give triazine-based polyamic acids which, on curing, yield the polyimides. From solutions of polyamic acids useful fibers, films, adhesives, coatings and composites can be prepared. The triazine-based polyimides possess high temperature oxidative stability, good mechanical properties and electrical properties and low void contents.

14 Claims, No Drawings

POLYIMIDES FROM 2,6-DIAMINO-S-TRIAZINES AND DIANHYDRIDES

The polyimides of this invention are characterized by a recurring unit having the following structural formula:

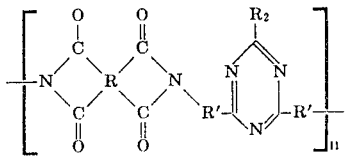

wherein
- R is a tetravalent radical containing at least one benzenoid or aromatic heterocyclic ring of five or six members, wherein the four carbonyl groups are attached directly to different carbon atoms in said rings such that the carbonyl groups in each pair are attached to adjacent atoms in said rings;
- R' is a divalent organic radical selected from aromatic, aliphatic and cycloaliphatic series;
- $R^2$ is hydrogen, amino, diarylamino di(lower)alkyl amino, anilino, N-(lower)alkyl anilino, diphenylamino, pyrrolidino, piperidino, phenyl, chloro, carboxyl, alkyl or hydroxyl group;
- n is an integer of 3 or more.

The (lower)alkyl group employed herein means a straight, or branched chain alkyl group having up to four carbon atoms. Examples of such groups are methyl, ethyl, propyl, iospropyl, butyl and the like.

The polyimides of the present invention have high tensile properties, exceptional stability to heat and water and good electrical properties. Thus, these polyimides are particularly useful as shaped structures such as films, fibers, filaments and composites with reinforcing agents such as glass fabrics, graphite and boron fibers.

The starting materials employed in the preparation of the polyimides of this invention are s-triazine compounds containing two primary aryl, alkyl and cycloalkyl amino groups and aromatic carboxylic acid dianhydrides. The triazine based diamines are characterized by the formula:

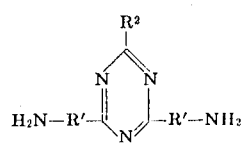

wherein
R' and $R^2$ are as defined above. More specifically, R' is selected from the following groups:
a. ortho, meta and para phenylene, biphenylene, naphthyl, anthracyl
b.

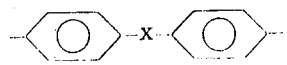

wherein X is sulfur, oxygen, sulfone, methylene, carbonyl, or alkyl or aryl substituted methylene groups c. alkylene groups having from two to eight carbon atoms, and
d. cycloalkyl groups, such as cyclopentyl, cyclohexyl and the like.

The blocking group $R^2$ mentioned above can be hydrogen, phenyl, substituted phenyl or an amino group illustrated below:
—$NH_2$, dialkylamino groups such as, dimethylamino, diethylamino, dipropylamine, diisopropylamino, dibutylamino and the like, pyrrolidino, piperidine, anilino, N-(lower)alkyl anilino compounds such as N-methyl anilino, N-ethyl anilino, N-butyl anilino, N-arylanilino compounds such as diphenylamino, N-naphthyl anilino, phenyl, and the like.

The substituents on the phenyl group can be nitro, halo, epsecially chloro or bromo, carboxyl, cyano, alkyl, especially methyl, ethyl, propyl and butyl or aryl groups.

The following s-triazine compounds exemplify a few types of diamines that can be employed in preparing the polyimides of this invention.

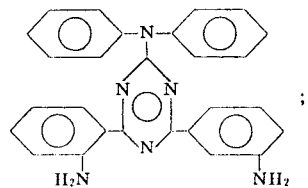

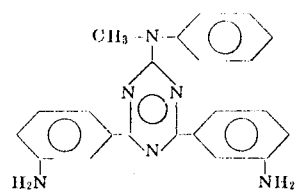

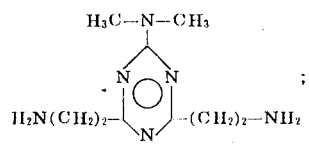

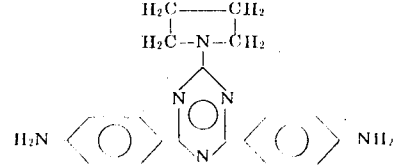

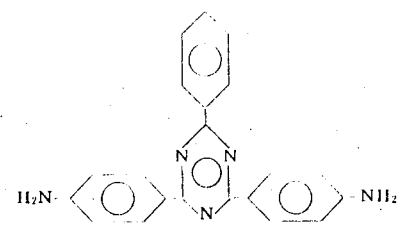

and the ortho and meta isomers.

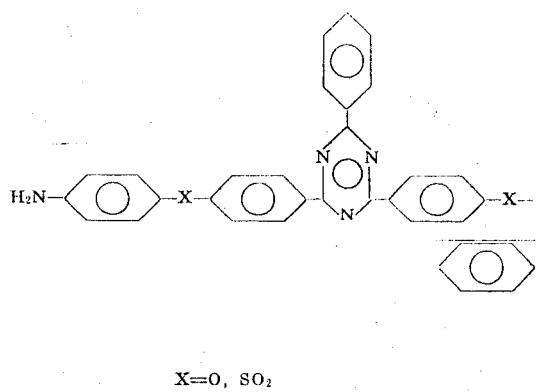

X=O, SO₂

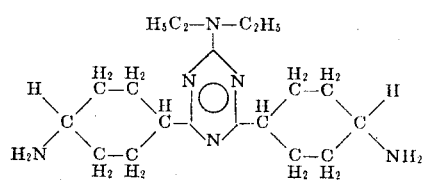

These diamines are generally prepared from two moles of a substituted nitro containing amidine and one mole of an anhydride. The resulting diintro-s-triazine is reduced to the desired diamine. The amino-s-triazine compounds of this invention can be prepared by various methods. One method comprises reacting a cyano alkyl, aryl, cycloalkyl or heterocyclic nitro compound with an acid chloride in the presence of a Friedel-Crafts catalyst. The resulting intermediate dinitro compound is reduced to the diamino-s-triazine with a standard reducing agent such as iron powder and weak hydrochloric acid. The illustrative examples of the catalysts are aluminum trichloride, antimony pentachloride, boron trifluoride and the like. The reaction is generally conducted between 75°C and 200°C. It also can be carried out in a solvent which will not interfere with the reaction, such as, for example, nitrobenzene, dichlorobenzene, tetrachloroethane and the like.

Another method for preparing these compounds comprises reacting a cyano alkyl, aryl, cycloalkyl or heterocyclic nitro compound with an alcohol in the presence of the alkoxide of the same alcohol, most preferably methanol and sodium methoxide. This is followed by a reaction with ammonium chloride yielding the corresponding nitroamidine hydrochloride. This intermediate is reacted with an anhydride and a salt of the acid derived from the same anhydride to yield the dinitro-s-triazine which is reduced to the diamino compound in the same manner as in the first method. The anhydride employed depends on the desired blocking group, that is, $R^2$ in the general formula above.

A still further method is useful in preparing the diamino-s-triazines having an amino or substituted amino groups as the blocking groups.

In this method cyanogen chloride is reacted with a desired amine (e.g. if diphenyl amino group is the desired blocking group, diphenyl amine is employed) forming the corresponding cyanoamine which is reacted with a cyano alkyl, aryl, cycloalkyl or heterocyclic nitro compound. In the last step a Friedel-Crafts catalyst is employed. The preparation of these compounds is described in greater detail in my copending application Ser. No. 873,110, filed Oct. 31, 1969.

The compositions of this invention can also be prepared by employing the several isomers of the diamino compounds, either separately or admixed with each other. For example, one can employ such isomers as p,p'-, m,m'-, and m,p'- diamino triphenyl-s-triazines separately or admixed with each other to prepare the instant compositions with optimum physical properties.

The s-triazine diamines discussed above generally have higher molecular weights than the diamines employed in preparing the prior art polyimides. This imparts an important advantage to the s-triazine based polyimides over the prior art polyimides since the polyamic acids of this invention evolve, on a weight basis, less water of condensation during the formation of polyimides. This water of condensation has a tendency to be entrapped in the polyimide resins causing voids, which usually open during high temperature use providing additional surface for oxidative attack. For this reason it is desirable to keep the water of condensation to a minimum. In the prior art polyimides the water of condensation is usually about 9 percent on a weight basis. In the polyimides of this invention substantially less water is evolved, generally about 5 percent or less. Thus thick moldings and composites of low void content are more readily prepared by employing the instant polyimides.

The dianhydrides useful in this invention are characterized by the general formula:

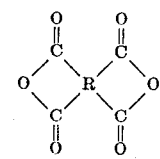

wherein the tetravalent radical

is as defined above and is selected from the following general groups: aromatic, aliphatic, cycloaliphatic, heterocyclic, combinations of aromatic and aliphatic, and substituted groups thereof. The R groups may be characterized by the following structures:

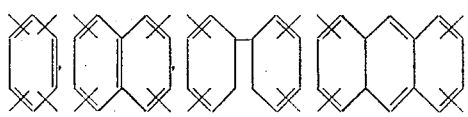

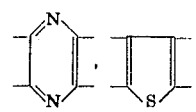

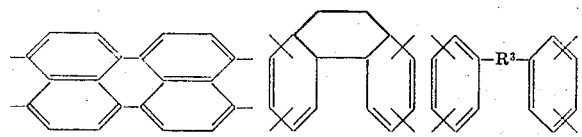

wherein $R^3$ is selected from the group consisting of —O—, —S—, —$SO_2$—,

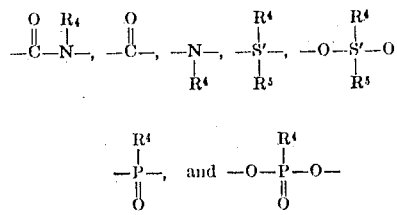

wherein $R^4$ and $R^5$ are alkyl or aryl, and substituted groups thereof.

In these dianhydrides every carbonyl group is attached directly to a separate carbon atom of the aromatic radical, the carbonyl groups being ortho or peri to each other so that the 5- or 6- membered anhydride rings are formed respectively.

The preferred aromatic dianhydrides are those in which the carbon atoms of each pair of carbonyl groups are directly attached to ortho carbon atoms in the R group to provide a 5-membered ring as follows:

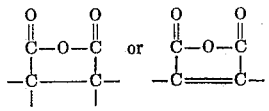

The following species are typical of tetracarboxylic acid dianhydrides suitable for practicing the invention:
Pyromellitic dianhydride
3,3',4,4'-benzophenone tetracarboxylic dianhydride
2,2',3,3'-benzophenone tetracarboxylic dianhydride
3,3',4,4'-diphenyl tetracarboxylic dianhydride
2,2',3,3'-diphenyl tetracarboxylic dianhydride
2,2-bis-(3,4-dicarboxyphenyl)propane dianhydride
2,2-bis-bis(2,3-dicarboxyphenyl)propane dianhydride
bis-(3,4-dicarboxyphenyl)ether dianhydride
bis-(3,4-dicarboxyphenyl)sulfone dianhydride
1,1-bis-(2,3-dicarboxyphenyl)ether dianhydride
1,1-bis-(3,4-dicarboxyphenyl)ether dianhydride
bis-(2,3-dicarboxyphenyl)methane dianhydride
bis-(3,4-dicarboxyphenyl)methane dianhydride
2,3,6,7-naphthalene tetracarboxylic dianhydride
1,2,5,6-naphthalene tetracarboxylic dianhydride
benzene-1,2,3,4-tetracarboxylic dianhydride
pyrazine-2,3,5,6-tetracarboxylic dianhydride
thiophene-2,3,4,5-tetracarboxylic dianhydride
pyridine-2,3,5,6-tetracarboxylic dianhydride
3,3,9,10-perylene tetracarboxylic dianhydride
1,4,5,8-naphthalene tetracarboxylic dianhydride
2,6-dichloronaphthalene-1,4,5,8-tetracarboxylic dianhydride
2,7-dichloronaphthalene-1,4,5,8-tetracarboxylic dianhydride
2,3,6,7-tetrachloronaphthalene-1,4,5,8-tetracarboxylic dianhydride
phenanthrene-1,8,9,10-tetracarboxylic dianhydride
2,3,3',4'-benzophenone tetracarboxylic dianhydride
and dianhydrides having the general structure:

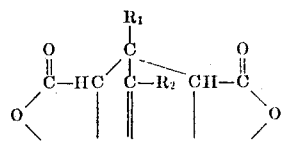

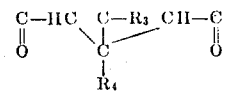

where $R_1$—, $R_2$—, $R_3$— and $R_4$ are each members selected from hydrogen, alkyl, aryl, and aralkyl.

The polyimides are prepared by a process comprising reacting the above described s-triazine diamines with dianhydrides in an organic reaction medium which is a solvent for at least one of the reactants, preferably under substantially anhydrous conditions, at a temperature below 100°C. The product of this reaction is a polyamic acid represented by the following general formula:

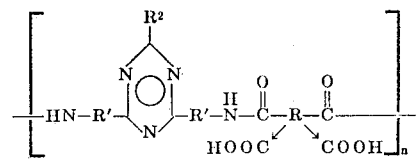

where the arrows indicate isomeric possibilities.

More specifically, the reaction can be carried out conveniently in a number of ways. The s-triazine diamine and the dianhydride can be premixed as dry solids in equimolar amounts and the resulting mixture can be added, in small portions and with agitation, to an organic solvent. This method is particularly effective in reactions which are relatively exothermic. However, it is also possible to add slowly with agitation the solvent to the premixed reactants. Another variation is to dissolve the s-triazine diamine in a solvent and then add thereto a dianhydride at a rate that provides a controllable rate of reaction. It is also possible to add the reactants separately in small portions to a solvent or to dissolve the reactants in separate portions of a solvent and then slowly adding the two solutions to the reaction vessel.

The degree of polymerization of polyamic acid is subject to a deliberate control. The use of equal molar amounts of the reactants under the prescribed conditions provides polyamic acids of high molecular weight. The use of either reactant in large excess limits the extent of polymerization. However, the scope of the process encompasses the use of an excess of either the diamine or the dianhydride. A large excess of either reactant results in an undesirably low molecular weight polyamic acid. For some purposes, it is desirable to use 1–3 percent excess of either reactant, preferably the dianhydride. Besides using an excess of one reactant to limit the molecular weight of the polyamic acid, a chain terminating agent such as phthalic anhydride or aniline can be used to "cap" the ends of the polymer chains.

In the preparation of the polyamic acid intermediate, it is essential that the molecular weight be such that the inherent viscosity of the polyamic acid is at least 0.1, preferably 0.3–5.0. The inherent viscosity is measured at 30°C at a concentration of 0.5 percent by weight of the polymer is a suitable solvent, e.g., N,N-dimethylacetamide, N-methyl pyrrolidone, dimethyl formamide, etc. In calculating the inherent viscosity, the viscosity of the polymer solution is measured relative to that of the solvent alone. As known in the polymer art, inherent viscosity is directly related to the molecular weight of the polymer.

The quantity of organic solvent used in the preferred process need only be sufficient to dissolve enough of one reactant, preferably the diamine, to initiate the reaction of the diamine and the dianhydride. For forming the composition into shaped articles, it has been found that the most successful results are obtained when the solvent represents at least 60 percent of the polymeric solution. That is, the solution should contain 0.05–40 percent of the polymeric component. The viscous solution of the polymeric composition containing 10 to 40 percent polyamic acid in the polymeric component dissolved in the solvent may be used as such for forming shaped structures.

The shaped articles containing a polyamic acid are then converted to the respective polyimide shaped articles. The conversion to polyimides can be made from polyamic acids as well as from their salts, such as the ammonium or triethyl ammonium salts of polyamic acids.

In preparing polyamic acid intermediates any organic solvent can be employed provided it does not interfere with the desired reaction. Thus, the normally liquid organic solvents of the N,N-dialkylcarboxylamide class are useful as solvents in the process of this invention. The preferred solvents are the lower molecular weight members of this class, particularly N,N-dimethylformamide and N,N-dimethylacetamide. They can easily be removed from the polyamic-acid and/or polyamide acid shaped articles by evaporation, displacement or diffusion. Other typical compounds of this useful class of solvents are:

N,N-diethylformamide
N,N-diethylacetamide
N,N-dimethylmethoxy acetamide
N-methyl caprolactam, etc.
N-methyl pyrrolidone Other solvents which may be used in the present invention are:

dimethylsulfoxide
tetramethyl urea
pyridine
dimethylsulfone
hexamethylphosphoramide
tetramethylene sulfone
formamide
N-methylformamide
butyrolactone
phenol One, or a mixture of two or more solvents can be employed. It is also possible to employ the above solvents in combination with poor solvents such as benzene, benzonitrile, dioxane, xylene, toluene and cyclohexane.

The specific temperature and reaction time in preparing polyamic acids will depend on the diamine and the dianhydride used, the solvent and the percentage of polyamic acid desired in the final composition. For most combinations of meta-aminophenyl or para-aminophenyl s-triazine derivatives and the dianhydrides falling within the above definition, it is possible to form compositions of 100 percent polyamic acid by conducting the reaction below 100°C. However, temperatures up to 175°C may be tolerated to provide shapable compositions. However, to obtain the maximum inherent viscosity, i.e., maximum degree of polymerization, for any particular combination of s-triazine diamine, dianhydride, solvent, etc., and thus product shaped articles such as films and filaments of optimum toughness, it has been found that the temperature throughout the reaction should be maintained below 60°C., preferably below 50°C.

The polyamic acid can be converted to polyimide by a varity of methods. One method comprises converting the polyamic acid by heating it to above 50°C. Heating serves to convert pairs of amide and carboxylic acid groups to imide groups. Heating may be conducted for a period of from a few seconds to several hours. It has been found that after a polyamic acid has been converted to a polyimide, if the polyimide is further heated to a temperature of 300°–500°C. for a short period, improvements in the thermal and hydrolytic stabilities of the polyimide are obtained.

A second method for converting a polyamic acid composition to a polyimide is a chemical treatment and involves treating the polyamic acid with a dehydrating agent alone or in combination with a tertiary amine, e.g., acetic anhydride or an acetic anhydride-pyridine mixture. A polyamic acid shaped article can be treated in a bath containing the acetic anhydride-pyridine mixture. It is believed that the pyridine functions as a catalyst for the action of the dehydrating agent, the acetic anhydride. Other possible dehydrating agents include propionic anhydride, butyric anhydride, valeric anhydride and mixed lower fatty-acid anhydrides. Other tertiary amine catalysts include triethylamine, isoquinoline, $\alpha,\beta$ or gamma-picoline, 2,5-lutidine, etc.

A third method for conversion involves the treatment with a carbodiimide, e.g., dicyclohexylcarbodiimmide. The carbodiimide also serves to dehydrate polyamic-acid to the polyimide.

As a fourth method of conversion, a combination treatment may be used. A polyamic acid may be partially converted to a polyimide by a chemical conversion treatment and then cyclization to a polyimide may be completed by subsequent heat treatment. After shaping, the completion of the cyclization to polyimide can be accomplished.

It should be understood that instead of shaping a polyamic acid composition into an article, the polyamic acid composition in a solvent may be used for coating. Such coating compositions may be pigmented with compounds such as titanium dioxide in amounts of 5–200 percent by weight. These coating compositions may be applied to a variety of substrates, for example, metals, e.g., copper, brass, aluminum, steel, etc., the metals in the form of sheets, fibers, wires, screening, etc.; glass in the form of sheets fibers, foams, fabrics, etc.; polymeric materials, e.g., cellulosic materials such as cellophane, wood, paper etc., polyolefins such as polyethylene, polypropylene, polystyrene, etc., perfluorocarbon polymers such as, polytetrafluoroethylene, copolymers of tetrafluoroethylene with hexafluoropropylene, etc., polyurethanes, all polymeric materials in the form of sheets, fibers, foams, woven and non-woven fabrics, screening, etc,; leather sheets; etc. The polyamic acid coatings are then converted to polyimide coatings by one or more of the processes described above.

The polyimides of this invention find many applications in a wide variety of physical shapes and forms.

Among the most significant of these forms are films and fibers. The useful combination of the desirable physical and chemical characteristics of this polymer is unique. The films and fibers not only possess excellent physical properties at room temperature, but retain their strength and excellent response to work-loading at elevated temperatures for prolonged periods of time. A behavior of this type offers commercial utility in a wide range of end uses. These polyimide polymers display excellent resistance to strong acids and alkalies, to corrosive atmospheres, outstanding resistance to degradation by high energy particles and gamma ray radiation. The polymer resists melting upon exposure at 500°C. for extended periods while retaining very high proportions of room temperature physical properties. Because of the unusual and surprising solubility properties of the prepolymer, it may be processed into shaped articles such as films and fibers by conventional techniques and then converted in situ to the polyimide polymer. Solutions of the s-triazine containing polyamic acids can be used to impregnate reinforcing fibers and fabrics like glass, boron, metal oxide whiskers and graphite. These prepregs are then cured to form rigid polyimide laminates or composites to form strong thermally resistant structural adhesive bonds between aluminum, stainless steel, titanium or other metals.

Films formed from the polymer of this invention can be used wherever films have heretofore been used. They serve advantageously in an extensive variety of wrapping, packaging and bundling applications. Additionally, the polymer and film-forming polymer can be used in automobile and aviation interior head lining materials, decorative trim, high temperature electrical insulation such as for wire enamels, slot liners, in dry transformers, capacitators, cable wrappings, etc., packaging of items to be exposed to high temperature or high energy radiation while within the package, corrosion-resistant pipe, duct work, containers and container linings, and laminating structures where the films are bonded to the sheet metal or foils, and a variety of other similar and related uses. In fiber form, the polymer offers possibilities for high temperature electrical insulation, protective clothing and curtains, filtration media, packing and gusseting materials, brake linings and clutch facings.

The polyimides of this invention have a high nitrogen content from the s-triazine ring and therefore are also useful as ablative heat-shield materials. This stems from the fact that rings containing interstitial nitrogen atoms have lower thermal conductivity than graphite or carbon.

Furthermore, the insertion of the s-triazine ring into the polyimide chains increases the temperature at which the polymer begins to lose weight (TCA). This makes it possible for the s-triazine polyimides to be used at higher temperatures than the prior art polyimides. Also, the s-triazine polyimides retain their flexibility at higher temperatures than the polyimides presently used.

To further illustrate the nature of this invention and the process employed in preparing the triazine-based polyimides, he following examples are presented below.

EXAMPLE 1

To a solution of 1.7 g. of 2-phenyl-4,6-bis(4-aminophenyl)-s-triazine in 29.7 g. of N,N-dimethylacetamide, 1.66 g. of 3,3',4,4'-benzophenonetetracarboxylic dianhydride was added in three portions with stirring. The reaction was continued at room temperature with stirring for about 4 hrs. Thereafter the polyamic acid solution was cast as a film on aluminum and cured for 1 hr. at 350°C. The elemental analysis of the resulting polyimide was carried out with the following results:

|  | C | H | N |
|---|---|---|---|
| Calculated for $(C_{38}H_{19}N_5O_5)_n$ | 72.95 | 3.06 | 11.19 |
| Found | 71.30 | 3.21 | 11.12 |

The polyimide film was aged isothermally in a forced air oven at 300°C. The percent weight retention and brittleness of the film was measured. The test for brittleness involved bending of the film over itself (180°) and the film was considered to be still flexible if it did not break.

| | Weight Retention: |
|---|---|
| After 100 hrs. | 96.7% |
| 300 hrs. | 96.7% |
| 1002 hrs. | 94.0% |
| 1300 hrs. | 92.0% |

The film was still flexible after 1560 hrs.

Thermogravimetric analysis in air gave a temperature of 530°C, which means that at that temperature the polymer begins to lose weight.

EXAMPLE 2

Following the procedure of Example 1, 3.40 g of 2-phenyl-4,6-bis(2'-aminophenyl)-s-triazine is reacted with 2.18 g of pyromellitic dianhydride in 50.2 g of N,N-di-methylacetamide. After about 4 hours of stirring a film is prepared from the resulting polyamic acid solution. After curing, the film exhibits properties equivalent to the polyimide of Example 1.

EXAMPLE 3

Employing the procedure of Example 1, 1.70 g of 2-phenyl-4,6-bis(3'-aminophenyl)-s-triazine is dissolved in 29.7 g of anhydrous N,N-dimethylacetamide and reacted with 1.66 g of benzophenone tetracarboxylic dianhydride. From the resulting polyamic acid a film is formed which exhibits good weight-loss properties at elevated temperatures.

EXAMPLE 4

Following the procedure described in Example 1, 3.40 g of 2-phenyl-4-(3'-aminophenyl)-6-(4'-aminophenyl)-s-triazine is reacted with 2.94 g of 3,3',4,4'methyl pyrrolidone. The resulting polyamic acid is molded into the desired shaped and cured to the corresponding polyimide having good physical properties at high temperature.

EXAMPLE 5

Employing the procedure of Example 1, the following reactions are carried out to prepare the corresponding polyamic acid prepolymers:

a. 3.68 g of 2-N-methylanilino-4,6-bis (3'-aminophenyl)-s1triazine and 2.68 g of 1,4,5,8-naphthalene tetracarboxylic dianhydride in dimethylsulfoxide;

b. 2.68 g of 2-diisopropylamino-4,6-diethyleneamino-s-triazine and 2.20 g of pyrazine-2,3,5,6-tetracarboxylic dianhydride in pyridine;

c. 5.24 g of 2-phenyl-4,6-bis(p,p'-aminodiphenylether)-s-triazine and 3.10 g of bis-(3,4-dicarboxyphenyl)-ether dianhydride in N,N-diethylacetamide.

The polyamic acids obtained from the above reactions are formed into films in the same manner as in Example 1 and tested for weight-loss at high temperatures. They exhibit desirable physical properties.

What is claimed is:

1. A polyimide consisting essentially of the recurring unit

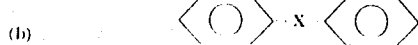

wherein R is a tetravalent radical containing at least one benzenoid or aromatic heterocyclic ring of five or six members, wherein the four carbonyl groups are attached directly to different carbon atoms in said rings such that the carbonyl groups in each pair are attached to adjacent atoms in said rings;

R' is a divalent organic radical selected from the group consisting of (a) ortho, meta and para phenylene, biphenylene, naphthylene, anthracylene (b)

wherein X is sulfur, oxygen, sulfone, methylene, carbonyl, or alkyl or aryl substituted methylene groups, (c) alkylene groups having from two to eight carbon atoms, and (d) cycloalkylene groups having 5 or 6 carbon atoms;

$R^2$ is hydrogen, amino, diarylamino, di(lower)alkyl amino, anilino, N-(lower)alkyl anilino, pyrrolidino, piperidino, phenyl, chloro, carboxyl, alkyl or hydroxyl group;

n is an integer of 3 or more.

2. A polyimide according to claim 1 wherein said R group has the structure selected from

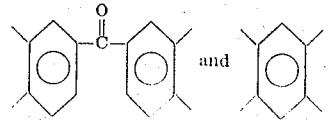

3. A polyimide according to claim 1 wherein said R' is a phenylene.

4. A polyimide according to claim 1 wherein $R^2$ is an amine group.

5. A polyimide according to claim 1, said polyimide consisting essentially of the recurring unit

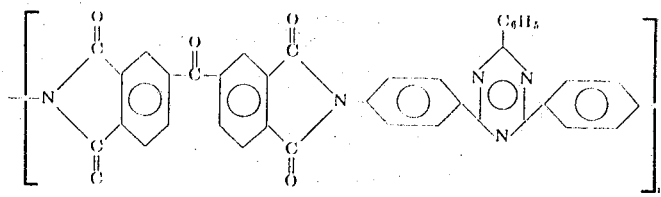

or

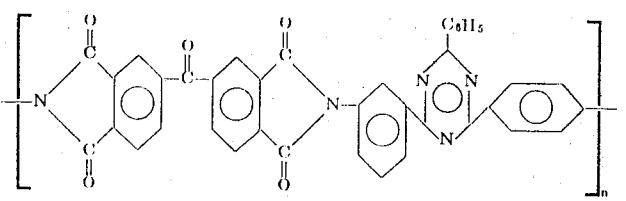

or mixtures thereof.

6. A polyimide according to claim 1, said polyimide consisting essentially of the recurring unit

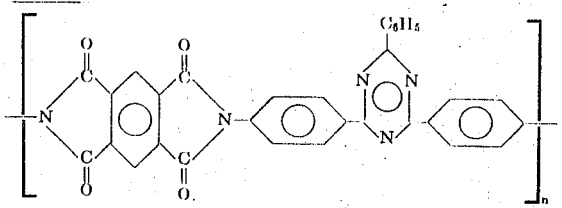

or

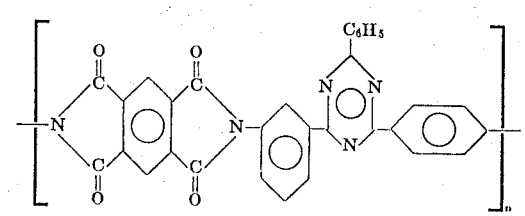

and mixtures thereof.

7. A polyimide of claim 1 in a form of a film.
8. A polyimide of claim 1 in a form of a fiber.
9. A polyimide of claim 1 as a coating on a substrate.
10. A polyimide of claim 5 in the shape of a film.
11. A polyimide of claim 6 in the shape of a film.
12. A polyamic acid consisting essentially of the recurring unit

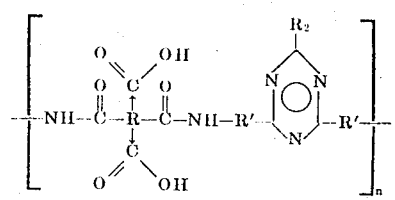

wherein R, R', R² and n are defined in claim 1, and the arrows indicate isomeric possibilities, said polyamic acid having the inherent viscosity of at least 0.1 measured at 30°C at a concentration of 0.5 percent by weight of the polymer in a solvent selected from N,N-dimethylacetamide, N-methyl pyrrolidone and dimethyl formamide.

13. A polyimide of claim 5 as a coating on a substrate.

14. A polyimide of claim 6 as a coating on a substrate.

* * * * *